United States Patent [19]
Khor et al.

[11] Patent Number: 5,821,285
[45] Date of Patent: Oct. 13, 1998

[54] METHOD OF PREPARING FILLER CONTAINING FORMS OF CHITIN

[75] Inventors: Eugene Khor; Andrew Chwee Aun Wan; Garth Winton Hastings, all of Singapore, Singapore

[73] Assignee: National University of Singapore, Singapore

[21] Appl. No.: 936,541

[22] Filed: Sep. 24, 1997

[30] Foreign Application Priority Data

Sep. 25, 1996 [SG] Singapore ............................ 9610678-6

[51] Int. Cl.⁶ ...................................................... C08K 3/34
[52] U.S. Cl. ............................. 524/27; 524/450; 530/200
[58] Field of Search ....................... 524/27, 450; 530/200

[56] References Cited

U.S. PATENT DOCUMENTS

| | | | |
|---|---|---|---|
| 4,490,497 | 12/1984 | Eurand et al. | 524/349 |
| 4,957,509 | 9/1990 | Tamari et al. | 623/16 |
| 5,047,031 | 9/1991 | Constantz | 606/77 |

*Primary Examiner*—Nathan M. Nutter
*Attorney, Agent, or Firm*—Birch, Stewart, Kolasch & Birch, LLP

[57] ABSTRACT

The method relates to the preparation of dry chitin forms of consistent shape that incorporates an advantageous additive such as fillers or reinforcement during the preparation process to give dry forms of chitin with consistent shape typically known as filler containing chitin or chitin composites.

10 Claims, No Drawings

METHOD OF PREPARING FILLER CONTAINING FORMS OF CHITIN

FIELD OF THE INVENTION

The present invention relates generally to the preparation of filler-containing forms of biopolymer based materials to give "composites". More particularly, the present invention relates to the process of incorporating a filler into chitin to form this composite in a two step process. The filler is first well dispersed in the biopolymer in a preferred solution process to give a consistent blend which is dried by a series of evaporation and solvent exchange sequences to give the dry form of the composite.

BACKGROUND OF THE INVENTION

In spinal surgery and in operations for removal of pathological areas of bone, there is a definite need for bone replacement materials that have adequate strength for weight-bearing and avoid the need for second operations. At present iliac crest bone is used, but this requires a second operation site and the consequence is a painful location for the patient. If a second site operation can be avoided by the use of synthetic materials, it would be a benefit to the patient.

A sound approach in developing a bone substitute material is the combining of polymer with minerals to give a material with the toughness and flexibility of the polymer and the strength and hardness of the mineral filler, a concept that has its beginnings in nature. In recent years, the biomaterials community has adopted this natural occurrence to generate several "composites", based on a polymer matrix reinforced with calcium hydroxyapatite (HA) as filler, for potential use as hard tissue substitute materials. The advantages of such "composites" include the enhancement of the osteogenic potential by the inclusion of bioactive HA and the polymer matrix acting as a binder to prevent migration of HA. The "composites" that have been developed to date can be classified as either bioactive or degradable systems. Bioactive non-degradable systems such as the polyethylene-HA composite was conceptualized to match natural bone both in composition and mechanical properties. The latter is important if stress shielding at the bone implant interface, which can eventually lead to implant loosening, is to be avoided. Furthermore, bone bonding was also found to be possible at the surface of the implant.

The use of degradable polymers as matrices forms a major approach to the developing of bone "composites" when compared to the non-degradable systems. Degradable matrices maximize the osteo-conductive behavior of HA, allowing bony ingrowth into the implant to occur as the matrix is resorbed with time. In this respect, the degradable matrices acts as a binder to prevent migration of HA from the implant site. Polymer-HA blends in the form of pastes or cements, have been reported to improve handleability during surgery, a moldable plastic material or injectable slurry being more easily applied than pure HA powder or granules. A major disadvantage of the biodegradable systems are their considerably inferior mechanical strength, when compared to natural bone. This limits their application to low load bearing regions of the human skeleton.

The present invention is aimed at developing biodegradable bone composite systems utilizing biopolymer-filler, particularly chitin-hydroxyapatite. Chitin and chitosan are naturally occurring polymers, associated with calcified tissues and have had some investigation for biomedical purposes. The materials are interesting as being the matrix polymer for calcification in shellfish, as collagen is in humans, and are thus expected to be appropriate for human skeletal uses. The use of them in composite materials containing calcium salts, e.g., calcium phosphates, would be of interest as substitute bone graft materials. As a modifier for hydroxyapatite ceramics, which are weak and have elastic modulus removed from that of bone, they would have direct application in development of bioactive implantable devices. In the present invention, chitin is combined advantageously with hydroxyapatite to produce a new "composite" material. The role of chitin would be analogous to its role as part of the organic matrix in the crustacean integument where, in conjunction with proteins, it acts as a support for the inorganic calcite. The use of chitin offers several advantages. Firstly, its biocompatibility and biodegradability, due to its breaking down by lytic enzymes to N-acetylglucosamine, allow it to be utilized for tissue repair processes by acting as a temporary scaffolding in a bone substitute, pending resorption of the implant and replacement by natural bone. Secondly, chitin polymer, being constituted of parallel arrangements of H-bonded chains, may give a better match in mechanical properties with natural bone, thus providing a high load bearing capacity as well as implant stability—characteristics critical especially at the early stage of bone healing. This composite is useful as a substitute for bone which has been removed due to diseases such as cancer. It may also be used as a bone substitute in reconstructive surgery such as in faciomaxillary surgery or in the spine for correcting defects in the long bone.

There has been no mention in the literature of preparing hydroxyapatite-chitin composites in the dry form, which is an object of this present invention. There has also been no mention of obtaining a chitin form with fillers other than hydroxyapatite, which is another object of this present invention. There are no known examples of dispersing a filler in a solvent process as proposed here to give chitin composites.

SUMMARY OF THE INVENTION

The present invention relates to a method of producing a filler-polymer composite system from chitin. This can be achieved by first dispersing the filler, favorable fine hydroxyapatite powder in a solvent, N, N-dimethylacetamide (DMAC) containing 5% LiCl. Once the hydroxyapatite is well dispersed enough chitin is added and allowed to dissolve to give a solution of between 0.1 to 2% weight/volume in chitin. The mixture/suspension may be cast or shaped in a mold and via a series of solvent evaporation and exchanges give a dry form of the composite. The dried form may be subsequently modified by chemical treatment to give new properties such as water compatibility.

The process described can also be extended to include other biopolymers such as derivatives of chitin/chitosan, cellulose or other polysaccharide based biopolymers that can be suitably used as described in the preparation of the composite. Other fillers that may be used include aluminum phosphate, derivatives of chitin/chitosan, calcium carbonate, carbon fibers, collagen or other fibrous proteins such as fibrin, calcium sulfate (gypsum-dehydrated), tricalcium phosphate or other biologically active calcium phosphates used as powders, whiskers or fibers or in porous block forms, phosphate containing glasses, calcium hydroxyapatite based glass ceramics, soluble glasses and glasses grown biotechnologically.

The materials described in this invention can be used for a variety of purposes in a variety of forms such as sheets, films, strips, blocks and plates. These applications include: wound or burn dressings, osseous membrane repair (periostem repair) around tooth implants, drug delivery management for example osteomyelitis, support for spinal fusion as alternative bone graft, plate fixing fractures in facial region, skull bone repair or replacement and use in cartilage repair.

DETAILED DESCRIPTION OF THE INVENTION

The term "filler-containing chitin composite" as used herein refers to the dry or subsequently rehydrated or solvent activated forms of the material obtained by the process of the invention. Furthermore chitin can be substituted by cellulose or any DMAC soluble polysaccharide in the form of but not limiting to, powder or flakes. The solvent can also be substituted by any solvent such as N-methyl morpholine oxide or suitable/common solvents for such materials. A filler material of the group comprising those mentioned in the summary is first dispersed in a DMAC/5% LiCl solvent system. Chitin, cellulose or any other DMAC soluble polysaccharide in the form of powder/flakes is then added to the suspension and stirred until complete dissolution of the powder/flakes takes place. The mixture is decanted into a mold of the required dimensions and gelation permitted to take place over 2 to 24 hours. The resulting gel is washed thoroughly with water to remove solvent by dialysis against deionized or any good grade water or appropriate solvent for at least 2 days or until washings show no presence of DMAC as detected by HPLC or any suitable quantification method for the solvent. The resulting gel is next subjected to solvent, air or vacuum drying processes, singly or in a combination of any or all the methods until a dry form of the filler-containing chitin composite is obtained. The solvent drying process includes exchange of the liquid phase of the gel from water to acetone or some appropriate volatile solvent for the purpose of accelerating the drying process. The composite so obtained in plate, strip, block or other suitable form can be further cut or machined to the final required dimensions. Given below are several specific illustrative techniques and examples for producing these composites in accordance with the principles of the invention. Although directed primarily to the preparation of hydroxyapatite-chitin composites, the techniques described herein are applicable to the creation of any other filler modified forms of chitin or other suitable biopolymer. It should be noted that these illustrative techniques are for illustration purposes only, and can be varied to achieve an optimal degree of solid state properties, but can also be applied in the wet form as is found if implanted as a bone substitute in humans or animals. Moreover, these illustrative methods and examples are for purposes of illustrating the present invention, and are not to be construed as limiting of the claims.

ILLUSTRATIVE METHODS AND EXAMPLES FOR PRODUCING HYDROXYAPATITE-CHITIN COMPOSITES

EXAMPLE 1

A method for producing chitin strips, sheet, films, plates, membranes modified with a bioactive component, hydroxyapatite ($Ca_{10}(PO_4)_6(OH)_2$), is described. For a chitin form containing 50% by mass of hydroxyapatite (HA), 0.2 g of HA was dispersed for 15 min in 42 ml of a solution of 5% LiCl (w/w and previously dried at 130° C.) in N,N-dimethylacetamide (DMAC). To this, 0.2 g of chitin was added and stirring continued over 2 days to completely dissolve chitin. The viscous suspension was carefully decanted into a mold of dimensions for example 22.5×5.5 cm, and the cast suspension was left in a dust free evaporation chamber or other facility that promotes the evaporation in a controlled manner overnight. By this time, a gel had formed, which was considerably smaller than the original dimensions. The gel was washed in several changes of deionized water for at least 2 days, whereupon further shrinkage occurred (approx. half the original dimensions). This gel was dried between pieces of filter paper and immersed in acetone for ½ hour. The specimens were stretched and dried under glass plates. Using a scalpel, the composites were cut to regular dimensions, which were approx. (8×1×0.4) $mm^3$.

This composite is potentially useful as a bone substitute material, where a few advantages are immediately apparent. First, the composite allows for the introduction of osteoconductive calcium hydroxyapatite into regions of bone loss with the chitin matrix acting as a binder to prevent post-operative migration of the calcium hydroxyapatite particles. Scanning electron microscopy examination shows an intimate dispersion of hydroxyapatite filler in the chitin matrix, which is desirable for a uniform composite. Gradual bio-degradation of chitin to non-toxic products permits for the subsequent resorption of the implant material. It has been shown from mechanical testing, that the viscoelastic properties of the chitin is retained even for a high loading (50% by mass) of calcium hydroxyapatite. This indicates that the composite has good fracture toughness and impact resistance. A composite that contained 50% by mass of filler exhibited a tensile strength of approximately 29 Mpa and elastic modulus of 2.4 GPa in the dry form. This strength is expected to diminish in an aqueous environment but not to a detrimental level.

EXAMPLE 2

The above method can also be applied to the incorporation of non-mineral materials such as a water soluble chitin derivative, for example, chitin phosphate, into chitin to produce a dried form. Chitin phosphate incorporated chitin film was prepared in the following way. 0.05 g of water soluble chitin phosphate (d.s. 0.4–0.5) was dispersed in 25 ml of a solution of DMAc/5% LiCl for 15 min. 0.12 g of chitin was then added to give a 0.5% chitin solution and the mixture was stirred overnight to completely dissolve both chitin and its phosphate derivative. The resulting dispersion was cast in a mold of dimensions 5×15 cm, and the cast dispersion left in the fume cupboard overnight. The coagulated film was washed and dried as described above, to give chitin phosphate incorporated chitin films.

Although chitin phosphate of the degree of substitution used (d.s. 0.4–0.5) is itself highly soluble in water, it is insoluble when incorporated in this form. It was determined that up to 30% of chitin-phosphate dispersed is retained in the final material, even after thorough washing with acetone and water. This fact is explained by H-bonding of chitin chains with chitin residues of the chitin phosphate backbone, which prevents solvation of the latter by water molecules. It also indicates that a microscopic mixture of the two components(i.e. chitin and chitin phosphate) is present in the form.

The form is useful for applications in an aqueous environment, combining the hydrophilicity of chitin phosphate and the water insolubility of chitin. Unlike carboxymethyl-chitin gels, water-swelling is minimal. A potential application may be the accumulation of uranium from waste waters, as chitin phosphate has been reported to have a high uranium binding capacity. It is also a potential biomaterial for in vivo applications. In this respect, an advantage over other water-insolubilized forms of chitin phosphate would be that the inclusion of potentially toxic cross-linking agents would be avoided.

We claim:

1. A method of incorporating a filler, calcium hydroxyapatite (HA) into chitin to form a composite, comprising:

(a) dispersing of calcium hydroxyapatite (HA) powder in a solution of LiCl in N,N-dimethylacetamide (DMAC);

(b) adding chitin to the resultant mixture from (a) and stirring until the chitin is completely dissolved;

(c) casting of the mixture in a mould of the required shape and dimensions to give a composite of HA in chitin;

(d) washing of the composite so formed by dialysis against several changes of deionized water or other appropriate solvents such as acetone;

(e) solvent drying of the hydroxyapatite-containing chitin composite with acetone or any appropriate solvent/drying agent.

2. A method of incorporating water soluble chitin derivatives such as chitin phosphate into chitin to produce a solid form in which the chitin derivatives are held in a non-water soluble matrix of chitin, comprising:

(a) dispersing a water soluble chitin derivative such as chitin phosphate in a solution of LiCl in N,N-dimethylacetamide;

(b) adding chitin to the dispersion and stirring until the chitin is completely dissolved;

(c) casting the resulting dispersion in a mold of the required shape or dimensions;

(d) washing of the coagulated form obtained after evaporation of the DMAC in several changes of deionized water, and (e) solvent drying of the form.

3. The method of claim 1 in which the mass of HA may vary from 1% to 90%.

4. The method of claim 1 in which the chitin content may vary from 10% to 99% and the percentage of LiCl in the solution of LiCl in DMAC may vary from 3% to 7%.

5. The method of claim 1 in which the filler may be any suitable filler agent such as calcium carbonate, calcium phosphate, calcium sulphate, aluminium phosphate or other bio-inert materials.

6. The method of claim 2 in which the chitin derivative may be 6-0-carboxymethyl-chitin or chitin sulphate.

7. The HA—chitin composite produced by the method in claim 1.

8. The chitin derivative—chitin form produced by the method in claim 2.

9. The method as in claim 1 for producing a filler—containing biopolymer composite in which the filler agent may be a derivative of chitin/chitosan, calcium hydroxyapatite, calcium carbonate, calcium phosphate, calcium sulphate, aluminium phosphate or other bio-inert materials, and the biopolymer may be a derivative of chitin/chitosan, cellulose or other polysaccharide polymers.

10. The method of claim 2 in which the chitin content may vary from 10% to 99% and the percentage of LiCl in the solution of LiCl in DMAC may vary from 3% to 7%.

* * * * *

UNITED STATES PATENT AND TRADEMARK OFFICE
CERTIFICATE OF CORRECTION

PATENT NO. : 5,821,285

DATED : October 13, 1998

INVENTOR(S) : Eugene Khor, et al

It is certified that error appears in the above-identified patent and that said Letters Patent is hereby corrected as shown below:

At col. 1, line 58, change "are" to --is--

At col. 3, line 17, change "limiting" to --limited--

At col. 5, line 10, change "dispersing of calcium" to --dispersing calcium--

At col. 5, line 14, change "casting of the" to --casting the--

At col. 5, line 16, change "washing of the" to --washing the--

At col. 5, line 19, after "acetone;" insert --and--

At col. 5, line 20, change "drying of the" to --drying the--

UNITED STATES PATENT AND TRADEMARK OFFICE
CERTIFICATE OF CORRECTION

PATENT NO. : 5,821,285

DATED : October 13, 1998  Page 2 of 2

INVENTOR(S) : Eugene Khor, et al

It is certified that error appears in the above-identified patent and that said Letters Patent is hereby corrected as shown below:

At col. 6, line 1, change "washing of the" to --washing the--

At col. 6, line 3, change "water," to --water;--

At col. 6, line 4, change "drying of the" to --drying the--

Signed and Sealed this

Third Day of April, 2001

Attest:

NICHOLAS P. GODICI

Attesting Officer  Acting Director of the United States Patent and Trademark Office